United States Patent [19]

Edwards et al.

[11] Patent Number: 5,815,212
[45] Date of Patent: Sep. 29, 1998

[54] VIDEO OVERLAY CIRCUIT FOR SYNCHRONIZING AND COMBINING ANALOG AND DIGITAL SIGNALS

[75] Inventors: Steve Edwards; Duc Ngo, both of San Jose; Mehrdad Nayebi, Palo Alto, all of Calif.

[73] Assignees: Sony Corporation, Tokyo, Japan; Sony Electronics, Inc., Park Ridge, N.J.

[21] Appl. No.: 585,105

[22] Filed: Jan. 11, 1996

Related U.S. Application Data

[60] Provisional application No. 60/000,370 Jun. 21, 1995.

[51] Int. Cl.⁶ ..................................................... H04N 5/04
[52] U.S. Cl. .......................... 348/501; 348/536; 348/584
[58] Field of Search ..................................... 348/501, 505, 348/506, 510, 512, 536, 584, 588, 589, 598, 563, 564; H04N 5/04, 5/445, 9/74, 9/45

[56] References Cited

U.S. PATENT DOCUMENTS

| | | | |
|---|---|---|---|
| 4,476,562 | 10/1984 | Sako et al. | 371/39 |
| 4,546,474 | 10/1985 | Sako et al. | 371/39 |
| 4,697,248 | 9/1987 | Shirota | 364/754 |
| 4,788,589 | 11/1988 | Kondo | 358/133 |
| 4,829,522 | 5/1989 | Nishiguchi | 371/31 |
| 4,994,906 | 2/1991 | Moriwake | 358/31 |
| 5,185,711 | 2/1993 | Hattori | 364/746.1 |
| 5,229,862 | 7/1993 | Takahashi et al. | 358/335 |
| 5,434,676 | 7/1995 | Okamoto et al. | 348/584 |
| 5,541,666 | 7/1996 | Zeidler et al. | 348/589 |
| 5,576,769 | 11/1996 | Lendaro | 348/564 |
| 5,633,688 | 5/1997 | Choi et al. | 348/584 |

*Primary Examiner*—Bryan Tung
*Attorney, Agent, or Firm*—Haverstock & Owens LLP

[57] ABSTRACT

A video/graphics overlay circuit receives an analog input composite video signal and a digital input composite video signal and combines them into a linear combination output composite video signal depending on the state of one or more mixer control signals. The two composite video input signals are each capacitively coupled to buffer and clamp circuits through which the blank or DC level of each signal is clamped to two volts. The outputs of the buffer and clamp circuits are then fed to a mixer circuit and burst separator circuits. The mixer circuit generates the output composite video signal which is a linear combination of the input composite video signals as controlled by the one or more mixer control signals. The burst separator circuits separate the burst signal from the input composite video signals. The extracted burst signals are then provided to a burst signal phase-locked loop for locking the burst signals of the input composite video signals in phase. The feedback loop of the burst signal phase-locked loop is closed through a digital encoder circuit and changes the phase and frequency of the burst signal within the digital input composite video signal until it is locked in phase with the analog input composite video signal. A burst lock signal is generated when the burst signals of the two input signals are locked in phase. A horizontal lock signal is generated when the horizontal sync signals of the two input signals are locked in phase. A black and white detector circuit generates a signal which indicates whether the analog input composite video signal is a black and white signal or a color signal.

27 Claims, 3 Drawing Sheets

VIDEO OVERLAY CIRCUIT FOR SYNCHRONIZING AND COMBINING ANALOG AND DIGITAL SIGNALS

RELATED APPLICATIONS

This application claims priority under 35 U.S.C. § 119(e) of the co-pending U.S. provisional application Ser. No. 60/000,370 filed on Jun. 21, 1995 and entitled "Video/Graphic Overlay IC." The provisional application Ser. No. 60/000,370 filed on Jun. 21, 1995 and entitled "Video/Graphic Overlay IC" is also hereby incorporated by reference.

FIELD OF THE INVENTION

The present invention relates to the field of generating an output video signal which is a combination of two input video signals. In particular, the present invention relates to the field of generating an output video signal which is a linear combination of an analog input video signal and a digitally encoded input video signal.

BACKGROUND OF THE INVENTION

The technique of digitally encoding a video signal and particularly a composite video signal, is well known. Sampling pulses are generated in synchronism with a color video burst signal. The sampling pulses have a repetition rate that is a multiple of the burst signal frequency. Each sample of the color video signal is encoded, or digitized, such as by pulse code modulation (PCM). Digitally encoded video signals are used in time base error correction devices, noise suppression devices, the addition of various special video effects and the like. Digitally encoded video signals are particularly advantageous for recording and reproduction and also for special types of transmission.

In many video transmission systems, color or chrominance information is represented by a particular phase of the chrominance subcarrier signal that is amplitude modulated with color information. Since the phase of the color subcarrier signal is used to represent color information, it is important that, when digitally encoding the color video signal, the phase of the sampling pulses be accurately controlled. Undesired phase shifts, such as may be due to temperature drift, aging of the electrical components, and the like, may result in a phase error in the sampling pulse relative to the chrominance subcarrier signal which has the effect of distorting or interfering with the overall chrominance effect of the video picture which ultimately is reproduced from the digitally encoded video signal.

To identify the aforementioned phase shifts between the sampling pulses and the chrominance subcarrier signal, the instantaneous phase angle of the burst signal at the time of sampling is determined. If the phase angle of the burst signal differs from a desired phase angle, the phase of the sampling pulses may be adjusted accordingly. If the phase angle of the burst signal is different than an expected phase angle, the phase difference between the modulated chrominance information and the signal will also be in error, thereby causing distortion of the color within an output video signal.

It is therefore important to the operation of the video transmission system that the burst signal is separated correctly from the composite video signal in order that the phase of the burst signal can be compared to the phase of a reference signal. Any error in separating the burst signal from the input composite video signal may result in an error determining the phase difference between the two signals and will cause the output video signal to be in error.

A composite color video signal includes horizontal synchronizing signals, a burst signal superimposed onto the pedestal level at the back porch of the horizontal synchronizing signal and a video information signal. The video information signal comprises a chrominance subcarrier having different phases amplitude-modulated with chrominance information. The composite color video signal includes both luminance and chrominance information. Separator circuits are utilized to separate the horizontal synchronizing signal and the burst signal from the incoming video signal. The burst signal has a burst signal frequency equal to 3.58 MHz, which is the frequency of the chrominance subcarrier $f_{sc}$.

Within the composite video signal the values of the components are determined by their relative amplitude with respect to the blank or pedestal level. It is therefore essential that the blank or pedestal level is maintained at a known level so that the value of the component of the composite video signal can be readily determined. In the past, the blank level has been set to a known DC level allowing the values of the components of the composite video signal to be determined by determining their amplitude with respect to the blank level. However, care must be taken when setting the blank level to a specific value that the remainder of the composite video signal is not altered. Video systems of the prior art, in order to set the blank level to a known value, would separate the chrominance and luminance information from the composite video signal and then hard-clamp the blank level of the composite video signal to the appropriate level. Such a system is disadvantageous because at least two additional pins on the integrated circuit and external components are required within the system.

The video signal can also be separated into a separate chrominance or C signal and separate luminance or Y signal. A properly configured television, monitor or display will accept the separate chrominance C and luminance Y signal.

The composite video signal contains information which is used by a video system to generate a video picture on a display, monitor or television. Each period, within the horizontal portion of a composite video signal contains information representing one horizontal output line which is to be output on the video display, monitor or television. Each horizontal period includes a horizontal synchronization pulse, a burst signal and a video information signal. In many video transmission systems, color or chrominance information is represented by a particular phase of the chrominance subcarrier signal that is amplitude modulated with color information. The horizontal synchronization pulse is used by a phase-locked loop to synchronize the system for displaying the next horizontal line of video information. The burst signal is used to synchronize the phase of the sampling pulses with the phase of the color subcarrier signal.

A video picture or frame is made up of a number of horizontal lines included within the video display. To display a video picture or frame the video system begins at the top of the screen and displays the information within the composite video signal one horizontal line at a time. The information for each horizontal line is contained within a horizontal period of the composite video signal. After each horizontal period, the video system moves to the next line and displays the information within the next horizontal period of the composite video system. This continues until the video system reaches the bottom line on the video display. After displaying the video information on the bottom line of the video display, the video system must reset itself to the top of the display in order to begin displaying the next frame. In order to allow the system to reset itself to the top of the video display a vertical blanking period is included within the composite video signal, after the video information for each frame. This vertical blanking period allows the video system to reset to the top of the video display and begin displaying the information for the horizontal lines of the next frame. Therefore, a number of horizontal periods, enough to comprise a frame or screen, are strung together, within the composite video signal. Between each frame, the composite video signal includes a vertical blanking period which allows the video system to perform a vertical reset and prepare to display the next frame by moving back up to the top of the video display.

During the vertical blanking period the composite video signal includes a first period of equalizing pulses, a period of serration pulses and a second period of equalizing pulses. During this vertical blanking period the video system resets itself to the top of the video display so that it is ready to begin displaying the information for the next frame. However, the video system must be notified of or be able to detect the vertical blanking period so that it can reset itself to the top of the video display. The serration pulses carry synchronization information used by the local vertical oscillator, within the video system, during a vertical reset.

The equalizing and serration pulses during the vertical blanking period are all generated at a frequency equal to twice the frequency of the horizontal synchronizing pulses. A sync separator circuit is used to separate all of the synchronization pulses from the composite video signal including the horizontal, equalizing and serration pulses. However, the sync separator circuit separates the synchronization pulses by comparing their amplitude with respect to the blank level of the signal and therefore has no way of differentiating between horizontal synchronization pulses, equalizing pulses and serration pulses. The output of the sync separator circuit is used by the horizontal phase-locked loop to lock the video system in phase with the composite video signal during the horizontal period of each frame. During the vertical blanking period, the sync separator circuit will output the equalizing and serration pulses which are generated at twice the frequency of the horizontal synchronization pulses. Thus, twice as many synchronization pulses are generated during the vertical blanking period as during the horizontal period.

A mixer circuit, as illustrated in FIG. 1, mixes two input signals together in a predetermined ratio forming an output signal. The mixing of the two input signals is controlled by a control signal which specifies the ratio of the input signals. Input signals Input1 and Input2 are coupled as inputs to the mixer circuit 10. A control signal Control is coupled as a control input to the mixer circuit 10 for controlling the mixing ratio of the two input signals Input1 and Input2. The mixer circuit 10 outputs an output signal Output which is a combination of the two input signals Input1 and Input2 in a predetermined ratio, as specified by the control signal Control. In this manner the mixer circuit 10 combines the two input signals Input1 and Input2 into a single output signal Output.

When either or both of the two input signals Input1 and Input2 are provided to the mixer circuit 10 from a separate integrated circuit, noise may be introduced into the output signal Output causing the output signal Output to be in error or perhaps distorted. This noise results because the level of the input signals Input1 and Input2 will each be in reference to a different ground reference signal when coupled from separate integrated circuits. The mixer circuit 10 has a separate ground reference signal. Each of the ground reference signals corresponding to each of the input signals Input1 and Input2 may be different than the ground reference signal of the mixer circuit 10. Thus, the level of each input signal Input1 and Input2 may be correct with respect to its own ground reference signal but may be in error with respect to the ground reference signal of the mixer circuit 10. Accordingly, when the input signals Input1 and Input2 are combined by the mixer circuit 10 generating the output signal Output, the different ground reference levels of each of the signals, will cause noise or distortion to be introduced into the output signal Output. This noise or distortion will negatively impact the quality of the output signal Output.

SUMMARY OF THE INVENTION

A video/graphics overlay circuit receives an analog input composite video signal and a digital input composite video signal and combines them into a linear combination output composite video signal depending on the state of one or more mixer control signals. The two composite video input signals are each capacitively coupled to buffer and clamp circuits through which the blank or DC level of each signal is clamped to two volts. The outputs of the buffer and clamp circuits are then fed to a mixer circuit and burst separator circuits. The mixer circuit generates the output composite video signal which is a linear combination of the input composite video signals as controlled by the one or more mixer control signals. The burst separator circuits separate the burst signal from the input composite video signals. The extracted burst signals are then provided to a burst signal phase-locked loop for locking the burst signals of the input composite video signals in phase. The feedback loop of the burst signal phase-locked loop is closed through a digital encoder circuit and changes the phase and frequency of the burst signal within the digital input composite video signal until it is locked in phase with the analog input composite video signal. A burst lock signal is generated when the burst signals of the two input signals are locked in phase. A horizontal lock signal is generated when the horizontal sync signals of the two input signals are locked in phase. A black and white detector circuit generates a signal which indicates whether the analog input composite video signal is a black and white signal or a color signal.

DETAILED DESCRIPTION OF THE PREFERRED EMBODIMENT

Figure 1:
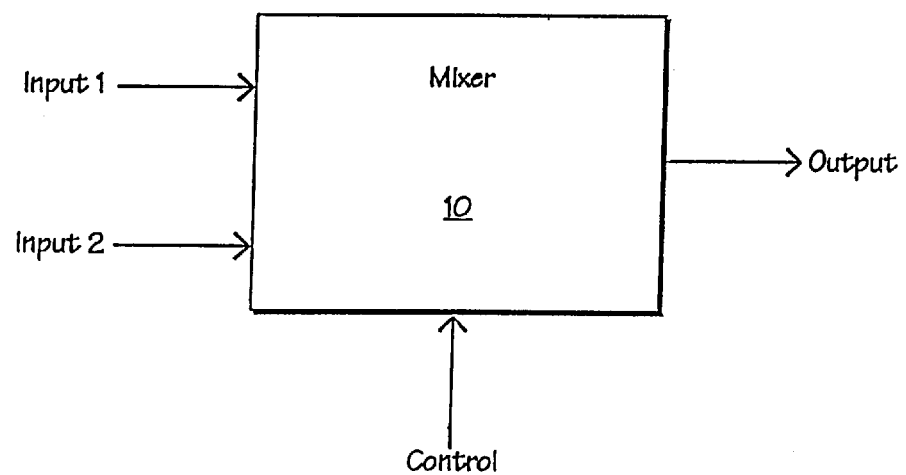
FIG. 1 illustrates a video mixer circuit which mixes two input signals together in a predetermined ratio.
Figure 2:
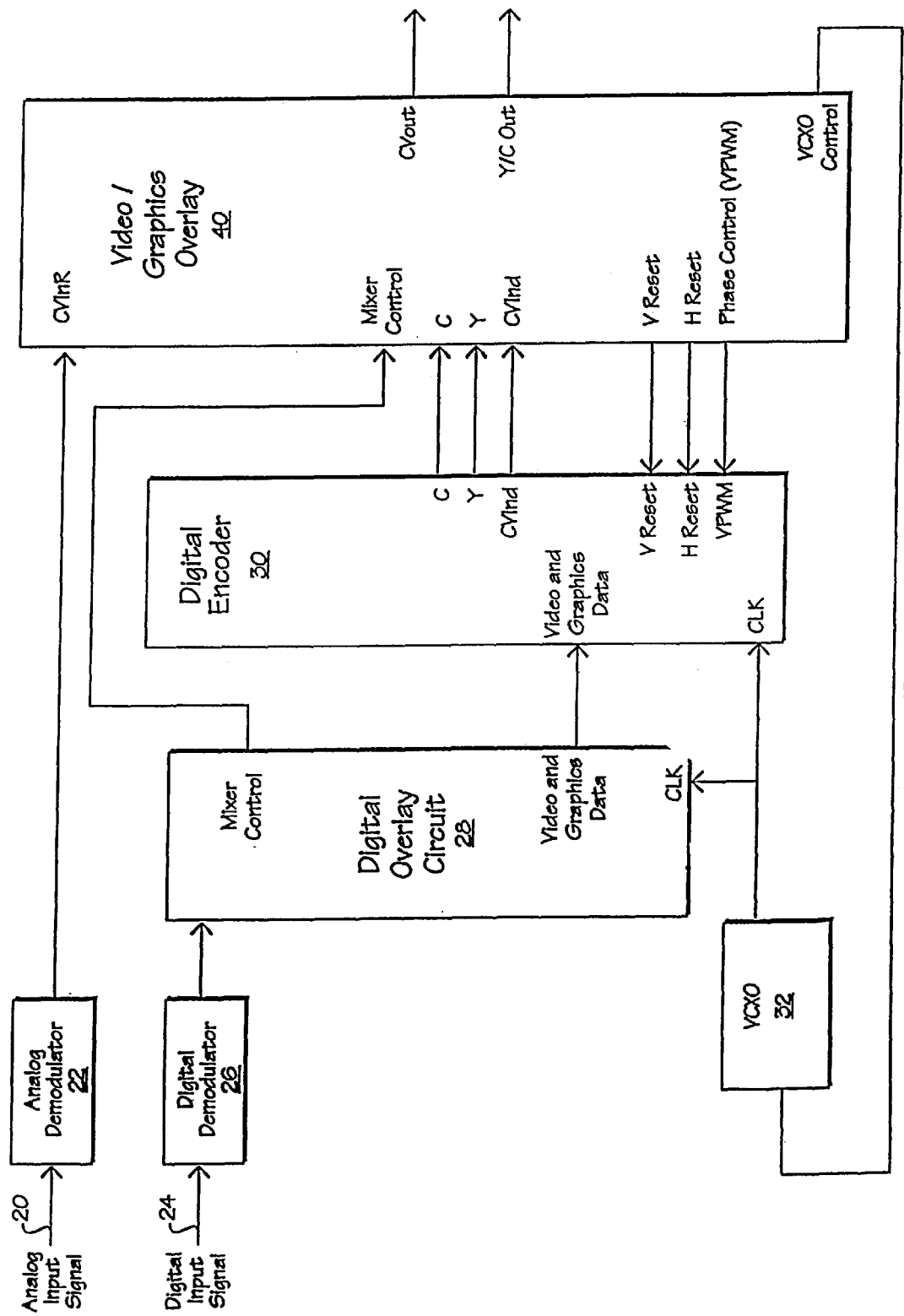
FIG. 2 illustrates a block diagram schematic of a video display system.

A block diagram schematic of a video display system of which the video/graphic overlay circuit of the present invention is a part, is illustrated in FIG. 2. An analog input video signal is input to an analog demodulator 22. An output of the analog demodulator 22 is coupled as an analog input composite video signal CVInR to a video/graphics overlay integrated circuit 40. A digital input video signal is input to a digital demodulator 26. An output of the digital demodulator 26 is coupled as an input to a digital overlay control circuit 28. A video and graphics data output of the digital overlay control circuit 28 is coupled as an input to a digital encoder 30 to provide the digital video signal to the digital encoder 30. A mixer control output of the digital overlay circuit 28 is coupled as an input to the video/graphics overlay integrated circuit 40. A voltage controlled oscillator (VCXO) 32 is coupled to provide a clock input signal to the digital overlay control circuit 28 and the digital encoder integrated circuit 30. The VCXO 32 is controlled by a control signal VCXO Control output from the video/graphics overlay integrated circuit 40. The digital encoder integrated circuit 30 encodes the video and graphics data received from the digital overlay control circuit 28 into an analog format composite video signal, which will be referred to as a digital input composite video signal CVInd, or a Y/C video signal (S-Video), depending on the format of the video and graphics data input. The digital encoder integrated circuit 30 is coupled to provide the digital input composite video signal CVInd, a C output signal C and a Y output signal Y, as inputs to the video/graphics overlay integrated circuit 40. The video/graphics overlay integrated circuit 40 is coupled to provide control signals VReset, HReset and Phase Control (VPWM) as inputs to the digital encoder integrated circuit 30.

The video/graphics overlay integrated circuit 40 of the present invention is configured to receive the analog input composite video signal CVInR and the digital input composite video signal CVInd which are combined in a predetermined format into an output composite video signal CVout. The video/graphics overlay integrated circuit 40 is configured for providing the output composite video signal CVout to a display system, such as a television. The video/graphics overlay integrated circuit 40 also provides Y/C video output signals to output a Y/C format video signal. If a Y/C format video signal is received by the video/graphics overlay integrated circuit 40 from the digital encoder integrated circuit 30 then the video/graphics overlay integrated circuit 40 will pass the Y and C signals through to the Y/C output and provide them in a purely digital format.

The digital video signal may be comprised of digital video, graphics data or both. In the preferred embodiment of the present invention, the output signal CVout may contain analog video only, analog video with graphics, digital video only, digital video with graphics and graphics only. The contents of the output signal CVout and the mixture or ratio of the output is controlled by the mixer control signals provided from the digital overlay control circuit 28. The digital video and graphics data are encoded into an analog format composite video signal using the digital encoder integrated circuit 30 and output as the digital input composite video signal CVInd. This output is coupled to the video/graphics overlay integrated circuit 40. If the composite video output signal CVout is to contain both analog and digital video information, then the analog video signal CVInR and the digital composite video signal CVInd are combined by the video/graphics overlay integrated circuit 40 using a predetermined ratio of signals, as specified by the mixer control signals, and output as the analog format composite video output signal CVout. It should be understood that when the digital input composite video signal CVInd is discussed herein an analog format composite video signal representing the digital video and graphics signal received by the digital encoder integrated circuit 30 from the digital overlay control circuit 28 is being referred to. In this configuration, the digital composite video signal CVInd must be in phase with the analog input video signal CVInR in order to avoid a distorted output signal and also to ensure the output video picture contains the appropriate colors. Accordingly, the video display system of the present invention employs an automatic phase correction circuit integrated within both the video/graphic overlay integrated circuit 40 and the digital encoder integrated circuit 30, as will be explained below, to lock the burst frequency and phase of the digital composite video signal CVInd to the burst frequency and phase of the analog input video signal CVInR.

When only a pure analog video signal is to be output by the video/graphics overlay integrated circuit 40, the analog input video signal CVInR is passed through the video/graphics overlay integrated circuit 40 and output as the composite video output signal CVout, without any mixing or encoding. Correspondingly, when only a pure digital, graphics or combined digital and graphics signal is to be output by the video/graphics overlay integrated circuit 40, the digital composite video signal CVInd, received from the digital encoder integrated circuit 30, is passed through the video/graphics overlay integrated circuit 40 and output as the composite video output signal CVout, without any mixing. When the mixer control signals specify that the composite video output signal CVout is to contain a predetermined portion of the analog input composite video signal CVInR and a predetermined portion of the digital input composite video signal CVInd, then the signals CVInR and CVInd are combined by the video/graphics overlay integrated circuit 40 into the output composite video signal CVout.

The mixer control signals include three signal lines M0, M1 and α. The signals M0 and M1 specify the content of the output composite video signal CVout and the signal α specifies the ratio of the analog input composite video signal CVInR to the digital input composite video signal CVInd, if both are to be combined. If a digital input video signal and graphics are to be combined into the digital input composite video signal, this is done by the digital overlay control circuit 28 and provided to the digital encoder integrated circuit 30 at the video and graphics data input. The following table illustrates the relationship of the mixer signals M0, M1 and α to the contents of the output composite video signal CVout.

TABLE I

| M0 | M1 | CVout |
|----|----|-------|
| L  | L  | CVout = αCVInR + (1 − α)CVInd |
| H  | L  | CVout = CVInR |
| L  | H  | CVout = CVInd |
| H  | H  | Not used |

As Table I illustrates, when both of the mixer control signals M0 and M1 are at a logical low voltage level the output composite video signal CVout is comprised of a level of the analog input composite video signal CVInR equal to the level of the signal α and a level of the digital input composite video signal CVInd equal to the level of one minus the level of the signal α. When the mixer control signal M0 is at a logical high voltage level and the mixer control signal M1 is at a logical low voltage level the output composite video signal CVout is comprised of only the analog input composite video signal CVInR. When the mixer control signal M0 is at a logical low voltage level and the mixer control signal M1 is at a logical high voltage level the output composite video signal CVout is comprised of only the digital input composite video signal CVInd.

Figure 3:
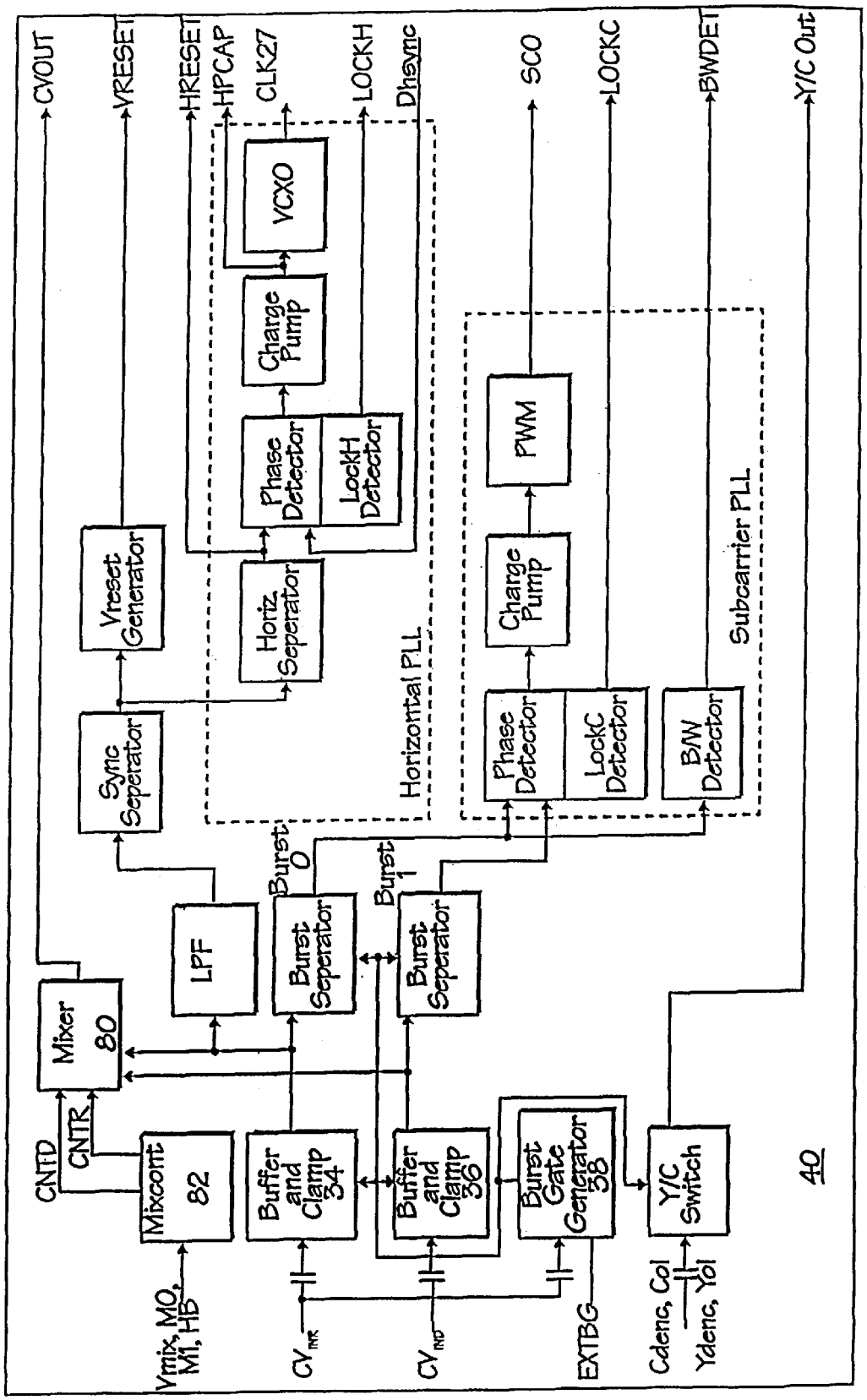
FIG. 3 illustrates a block diagram schematic of a video/graphics overlay circuit according to the present invention.
Figure 3:
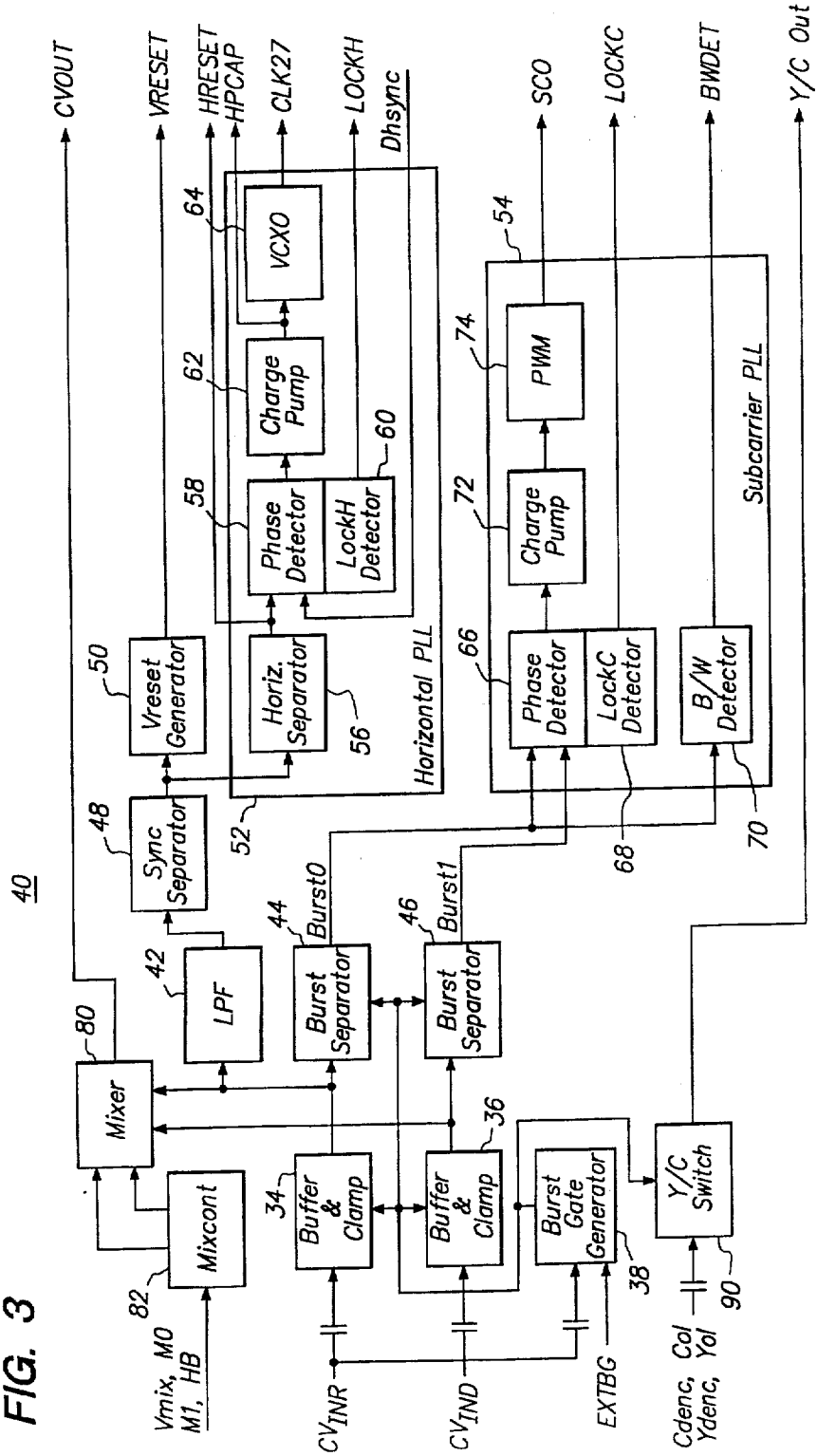

A schematic block diagram of the video/graphics overlay circuit 40 of the present invention is illustrated in FIG. 3. The analog input composite video signal CVInR is received from the analog demodulator 22 and coupled as an input to a buffer and clamp circuit 34 and as an input to a burst gate generator circuit 38. The digital input composite video signal CVInd is received from the digital encoder circuit 30 and coupled as an input to a buffer and clamp circuit 36. A separate chrominance signal Cdenc and luminance signal Ydenc from the digital encoder circuit 30 are coupled as inputs to a Y/C switch 90. A separate chrominance signal Co1 and luminance signal Yo1 are separated from the output composite video signal CVout and coupled as inputs to the Y/C switch 90 providing a feedback path from the output. The output of the Y/C switch 90 provides separate Y/C output signals. When separate signals Y and C are output, the Y/C switch 90 outputs either the separate chrominance signal Cdenc and luminance signal Ydenc or the separate chrominance signal Co1 and luminance signal Yo1.

The mixer control signals Vmix, M0 and M1 and a horizontal blanking signal HB are coupled as inputs to a mixer control circuit 82. The mixer control signal Vmix corresponds to the signal α, discussed above, which specifies the mixing ratio of the two input composite video signals CVInR and CVInd. Outputs of the mixer control circuit 82 are coupled as inputs to a mixer circuit 80. The mixer control circuit 82 generates the outputs to control the mixer circuit 80 based on the state of the mixer control signals Vmix, M0 and M1.

An external burst gate signal EXTBG is coupled as an input to the burst gate generator 38. An output of the burst gate generator circuit 38 is coupled as an input to the Y/C switch 90, to the buffer and clamp circuits 34 and 36 and to burst separator circuits 44 and 46. The burst gate generator circuit 38 provides a burst pulse signal which informs the Y/C switch 90, the buffer and clamp circuits 34 and 36 and the burst separator circuits 44 and 46 that the burst signal is present within the analog input composite video signal CVInR. When the analog input composite video signal CVInR and the digital input composite video signal CVInd are locked together in phase the activation of the burst pulse signal will also represent that the burst signal is present within the digital input composite video signal CVInd. The burst gate generator circuit 38 will only generate the burst pulse signal when the analog input composite video signal CVInR is present. When the analog input composite video signal CVInR is not present, the external burst gate signal is utilized to inform the necessary circuitry that the burst pulse is present. This external burst gate signal EXTBG is automatically selected when the mixer control signal M1 is at a logical high voltage level and the output composite video signal CVout is comprised of only the digital input composite video signal CVInd.

An output of the buffer and clamp circuit 36 is coupled as an input to the burst separator circuit 46 and to the mixer circuit 80. An output of the buffer and clamp circuit 34 is coupled as an input to the burst separator circuit 44, to a low pass filter 42 and to the mixer circuit 80. An output of the mixer circuit 80 provides the output composite video signal CVout.

An output of the low pass filter 42 is coupled as an input to a sync separator circuit 48 for separating the synchronization signals from the analog input composite video signal. An output of the sync separator circuit 48 is coupled as an input to a vertical reset generator circuit 50 and to a horizontal sync separator circuit 56. An output of the vertical reset generator circuit 50 provides a vertical reset signal VRESET which signals to the video system that it is time for a vertical reset to the top of the screen for displaying the next frame. An output of the horizontal separator circuit 56 provides a horizontal reset signal HRESET which signals that it is time for a horizontal reset to display the next horizontal line of information. The output of the horizontal separator circuit 56 is also coupled as an input to a horizontal phase detector circuit 58. A digital horizontal synchronization pulse signal Dhsync from the digital encoder 30 is also provided as an input to the horizontal phase detector circuit 58. The horizontal phase detector circuit 58 detects any difference in phase between the output of the horizontal separator circuit 56 and the digital horizontal synchronization pulse signal Dhsync. The phase detector 58 is coupled to a horizontal lock detector circuit 60. An output of the horizontal lock detector circuit 60 provides a horizontal lock signal LockH for signalling that the output of the horizontal separator circuit 56 and the digital horizontal synchronization pulse signal Dhsync are locked together in phase.

An output of the horizontal phase detector circuit 58 is coupled as an input to a charge pump circuit 62. An output of the charge pump circuit 62 is coupled as an input to control a voltage controlled oscillator 64. An output of the voltage controlled oscillator 64 provides a clocking output signal which preferably has a frequency of 27 MHz. Together, the horizontal separator circuit 56, the horizontal phase detector circuit 58, the charge pump circuit 62 and the voltage controlled oscillator 64 form a horizontal phase-locked loop 52 for locking in phase the horizontal synchronization pulses of the analog input composite video signal CVInR and the digital input composite video signal CVInd. The output from the voltage controlled oscillator 64 provides a clock reference signal CLK27 which is used to clock the horizontal synchronization pulses of the digital input composite video signal CVInd. The frequency of the digital input composite video signal is adjusted by the horizontal phase-locked loop 52 to match the frequency of the analog input composite video signal CVInR. In a similar manner, the horizontal phase-locked loop 52 can also be utilized with an external voltage controlled oscillator to generate a clock signal. The output of the charge pump circuit 62 is also provided as the control signal HPCAP for controlling the external voltage controlled oscillator.

An output Burst0 of the burst separator circuit 44 is coupled as an input to a burst phase detector circuit 66 and to a black and white detector circuit 70. The output Burst0 of the burst separator circuit 44 represents only the burst signal from the analog input composite video signal CVInR. An output Burst1 of the burst separator circuit 46 is coupled as an input to the burst phase detector circuit 66. The output Burst1 of the burst separator circuit 46 represents only the burst signal from the digital input composite video signal CVInd. The burst phase detector circuit 66 detects any difference in phase between the burst signals of the analog input composite video signal CVInR and the digital input composite video signal CVInd. The burst phase detector 66 is coupled to a burst lock detector circuit 68. An output of the burst lock detector circuit 68 provides a burst lock signal LockC for signalling that the output Burst0 and the output Burst1 are locked together in phase.

An output of the black and white detector circuit 70 provides an output signal BWDet which when active signals that the analog input composite video signal CVInR is a color video signal. When the output signal BWDet is not active it signals that the analog input composite video signal CVInR is a black and white video signal. The black and white detector circuit 70 differentiates between a color and a black and white video signal by determining if there is a burst signal present within the analog input composite video signal CVInR. If a burst signal is present within the analog input composite video signal CVInR then the analog input composite video signal CVInR is a color video signal. If no burst signal is present then the analog input composite video signal CVInR is a black and white video signal.

An output of the phase detector circuit 66 provides an input to a charge pump circuit 72. An output of the charge pump circuit 72 is coupled as an input to a pulse width modulation circuit 74. An output of the pulse width modulation circuit 74 is provided as a phase control signal SCO which is coupled to the digital encoder circuit 30. The phase detector circuit 66, the charge pump circuit 72 and the pulse width modulation circuit 74 form a portion of a burst signal phase-locked loop 54. The remainder of the burst signal phase-locked loop 54 is included within the digital encoder 30 which includes a numerically controlled oscillator for controlling the phase of the digital input composite video signal CVInd generated by the digital encoder 30. The burst signal phase-locked loop 54 alters the phase of the burst signal within the digital input composite video signal CVInd in order to lock the digital input composite video signal CVInd in phase with the analog input composite video signal CVInR.

The video/graphics overlay circuit 40 receives the analog input composite video signal CVInR and the digital input composite video signal CVInd and combines them in a predetermined format into the output composite video signal CVOut. The analog input composite video signal CVInR and the digital input composite video signal CVInd are combined by the mixer circuit 80. The mixer control circuit 80 receives the control input signals Vmix, M0 and M1 and will control the mixer circuit 80 according to the states of those signals, as described above and illustrated in Table I. The output composite video signal CVOut is then transmitted to a video display device such as a television or monitor. Alternatively, the video/graphics overlay circuit 40 will output separate chrominance C and luminance Y signals through the output signal Y/C out.

The burst gate generator circuit 38 generates a burst gate signal representative of a time period during which a burst signal is present within the analog input composite video signal CVInR. The burst gate pulse generator 38 detects the end of the horizontal synchronization signal and begins the burst gate pulse at the end of the horizontal synchronization signal. A timing circuit within the burst gate pulse generator 38 includes a charge storage device and a charge delivery device which control the duration of the burst pulse. When the burst pulse is activated the charge delivery device controls the duration of the burst pulse. When the burst pulse is activated the charge delivery device begins building a charge across the charge storage device until a threshold value is reached. Once the charge stored across the charge storage device equals the threshold value the burst pulse is deactivated. During the time when the burst pulse is active, the burst signal will be present within the analog input composite video signal CVInR. In order to have a fixed value for a sync tip of the horizontal synchronization pulse and to be able to apply certain thresholds within the burst gate pulse generator, the sync tip of the input composite video signal CVInR is clamped to a level equal to 2.5 volts. Preferably, the burst gate pulse generated by the burst gate pulse generator 38 has a duration equal to 3.5 microseconds. The burst gate generator circuit 38 uses the analog input composite video signal CVInR to generate the burst gate pulse signal. However, when the analog input composite video signal CVInR and the digital input composite video signal CVInd are locked together in phase, the burst signals will be present within both of the input composite video signals at the same time. A preferred embodiment of the burst gate generator circuit 38 is described in co-pending U.S. patent application Ser. No. 08/583,986, filed on the same date as the present application and entitled "Burst Gate Pulse Generator," which is hereby incorporated by reference.

The buffer and clamp circuits 34 and 36 clamp the blank or DC level of the analog input composite video signal CVInR and the digital input composite video signal CVInd, respectively, to a known value without altering the other components of the signals. The values of the components within the composite video signals CVInR and CVInd are determined by determining their amplitude with respect to the blank level. The buffer and clamp circuits 34 and 36 set the blank level of the composite video signal to a known level for determining the true value of the components. The output of the buffer and clamp circuits 34 and 36 provide composite video signals representative of the input composite video signals CVInR and CVInd with the blank or pedestal level set to a known DC level. Preferably, the DC level is set to two volts. The burst gate pulse representing the presence of a burst signal within the composite video signal is received by the buffer and clamp circuits 34 and 36 from the burst gate generator circuit 38. During the burst period, the buffer and clamp circuits 34 and 36 soft clamps the blank level of the composite video signals CVInR and CVInd to the appropriate level without altering the content of the burst signals. The DC level of the output signal is compared to the appropriate level by a comparator circuit. During the burst period, if the DC level of the input composite video signals CVInR and CVInd is less than the appropriate level, it is raised by a charging circuit within the buffer and clamp circuits 34 and 36. During the burst period, if the DC level of the input composite video signals CVInR and CVInd is greater than the appropriate level, it is lowered by a discharging circuit. During non-burst periods, when the burst signal is not present within the composite video signals CVInR and CVInd, the charging and discharging circuits within the buffer and clamp circuits 34 and 36 are disabled and the DC level of each of the composite video signals CVInR and CVInd are maintained at a constant level. A preferred embodiment of the buffer and clamp circuits 34 and 36 is described in co-pending U.S. patent application Ser. No. 08/885,298, filed on the same date as the present application and entitled "Composite Video Signal Backporch Soft-Clamp System Using Servo Loop," which is hereby incorporated by reference.

The burst separator circuits 44 and 46 receive the clamped analog input composite video signal CVInR and the clamped digital input composite video signal CVInd, respectively. The burst separator circuits 44 and 46 also each receive the burst gate pulse from the burst gate generator circuit 38 which represents the presence of the burst signal within the input composite video signals. During a burst period, when the burst gate pulse is active, the burst signal is extracted from the input composite video signals CVInR and CVInd by the burst separator circuits 44 and 46 and converted to square waveforms. Within each of the burst separator circuits 44 and 46, a differential pair and comparator circuit monitors the appropriate input composite video signal and compares it to a constant level reference voltage signal. A constant high voltage level is output, during a burst period, when the burst signal is greater than the constant level reference signal. A constant low voltage level is output, during a burst period, when the burst signal is less than the constant level reference signal. During non-burst periods a constant DC level voltage signal is output by the burst separator circuits 44 and 46. A preferred embodiment of each of the burst separator circuits 44 and 46 is described in co-pending U.S. patent application Ser. No. 08/585,429, filed on the same date as the present application and entitled "Burst Separator And Slicer Circuit," which is hereby incorporated by reference.

The mixer circuit 80 combines the analog input composite video signal CVInR and the digital input composite video signal CVInd into the output composite video signal CVout in a predetermined ratio, as specified by the mixer control signals Vmix, M0 and M1. The mixer control signal Vmix corresponds to the mixer control signal $\alpha$, discussed above, and specifies the ratio of the input signals. Table I above illustrates the relationship of the mixer signals Vmix, M0 and M1 to the contents of the output composite video signal CVout. The mixer circuit 80 of the preferred embodiment includes common-mode noise rejection to reduce the effect of noise within the output composite video signal CVout. Because the input video signals CVInR and CVInd are provided from different integrated circuits with potentially different ground levels, the input signals CVInR and CVInd and their respective ground signals are all coupled to the mixer circuit 80. The mixer circuit eliminates common-mode noise within the output composite video signal CVout, caused by each input signal having a different ground reference signal, by passing each input signal differentially with its respective ground reference signal to a standard Gilbert Cell. The mixer control signals output from the mixer control circuit 82 are coupled as inputs to the Gilbert Cell for controlling the ratio of the input signals CVInR and CVInd included within the output composite video signal CVout. The Gilbert Cell receives the differential input signals CVInR and CVInd and outputs a differential output signal comprised of a predetermined ratio of the input signals as specified by the control signals. The differential output signal is then converted to a single ended output signal. After being converted to a single ended output voltage, the single ended output signal is passed through an output buffer and provided as the output composite video signal CVout. A preferred embodiment of the mixer circuit 80 is described in co-pending U.S. patent application Ser. No. 08/534,926, filed on the same date as the present application and entitled "Mixer With Common-Mode Noise Rejection," which is hereby incorporated by reference.

When the analog input composite video signal CVInR and the digital input composite video signal CVInd are mixed and combined into the output composite video signal CVOut, it is necessary that the phase and frequency of the input video signals CVInR and CVInd are equal to ensure a correct display of the output video signal CVout. An automatic phase correction circuit is implemented by the burst signal phase-locked loop 54 and corresponding circuitry within the digital encoder circuit 30. The automatic phase correction circuit locks the burst frequency of the analog composite video signal CVInR and the digital video CVInd together utilizing a numerically controlled oscillation circuit when both the analog and digital video signals are combined into the output composite video signal CVout. The phase and frequency of the digital composite video signal CVInd are adjusted to match the phase and frequency of the analog input composite video signal CVInR. The burst frequency and phase of the digital composite video signal CVInd is compared to the burst frequency and phase of the analog input composite video signal CVInR by the phase detector circuit 66. Any difference detected between the burst frequency and phase of the digital input composite video signal CVInd and the analog input composite video signal CVInR by the phase detector circuit 66 is then used to correct the burst frequency and phase of the digital composite video signal CVInd. The phase detector circuit 66 provides an output signal which is used by the charge pump circuit 72 to control a numerically controlled oscillator of which the pulse width modulation circuit 54 is a part. The remainder of the numerically controlled oscillator is implemented within the digital encoder circuit 30. A preferred embodiment of the automatic phase correction circuit is described in co-pending U.S. patent application Ser. No. 08/585,398, filed on the same date as the present application and entitled "Automatic Phase Control Apparatus For Phase Locking The Chroma Burst Of Analog And Digital Video Data Using a Numerically Controlled Oscillator," which is hereby incorporated by reference.

Because the automatic phase control circuit uses the burst signals to lock in phase the analog input composite video signal CVInR and the digital input composite video signal CVInd, the circuit will be in a hold mode during the remaining portions of the composite video signal. The charge pump circuit 72 therefore includes an error regulator circuit which maintains the voltage across a charge pump capacitor during an inactive period at an appropriate level by monitoring the charge pump control signals UP and DOWN. The voltage level across the charge pump capacitor is only allowed to vary a predetermined amount before the current sources within the charge pump circuit are disabled. When either of the charge pump control signals UP and DOWN remain at a logical high voltage level for a predetermined period of time, indicating that the charge pump circuit is in a hold mode, the current sources within the charge pump are temporarily disabled. Therefore, during a hold period, the charge pump circuit is prevented from charging or discharging the charge pump capacitor past a predetermined threshold level, thereby allowing the charge pump circuit to maintain an appropriate level of charge across the charge pump capacitor during an inactive or hold period. A preferred embodiment of the charge pump circuit 72 is described in co-pending U.S. patent application Ser. No. 08/584,925, filed on the same date as the present application and entitled "Error Regulator Circuit For Sample And Hold Phase Locked Loops," which is hereby incorporated by reference.

The charge pump circuit 72 further includes a circuit for maintaining phase lock between the burst signals of the analog input composite video signal CVInR and the digital input composite video signal CVInd. As described above, the charge pump circuit charges and discharges a storage element, preferably a capacitor, to an appropriate voltage level in response to the one or more control signals. The voltage level stored across the storage element is used by a phase-locked loop to establish and maintain phase lock between the two signals CVInR and CVInd. When phase lock has been established between the two signals, the phase detector 66 detects this phase lock and the control signals from the phase detector 66 will become inactive. Once phase lock has been established and during other periods of time when all of the one or more control signals are inactive, the charge pump circuit provides high impedance charge and discharge paths for the storage element in order to maintain a constant level of voltage across the storage element. The high impedance charge and discharge paths prevent leakage from the storage element and minimize the droop rate of the voltage level across the storage element, thereby maintaining a constant voltage level across the storage element when the one or more control signals are all inactive. The preferred embodiment of the circuit for maintaining phase lock between the burst signals of the analog input composite video signal CVInR and the digital input composite video signal CVInd is described in co-pending U.S. patent application Ser. No. 08/592,545, filed on the same date as the present application and entitled "Low Leakage Charge Pump Circuit For Maintaining A Constant Level Of Charge," which is hereby incorporated by reference.

The Y/C switch 90 switches between the separate chrominance signal Co1 and luminance signal Yo1 and the separate chrominance signal Cdenc and separate luminance signal Ydenc using a current-mode switch. Each of the input signals Co1, Yo1, Cdenc and Ydenc are provided with their blank levels clamped to a predetermined constant level. Preferably, the blank levels are clamped to two volts. An output signal Y/C Out is output by the Y/C switch 90 which represents one of the sets of the input signals, either the input signals Co1 and Yo1 or the input signals Cdenc and Ydenc. The Y/C switch 90 receives two control signals from the video system which specify which one of the sets of input video signals are to be represented by the output signal. A back-to-back diode configured isolation circuit is used to isolate from the output signal the one of the two input video signals which is not represented by the output signal. A preferred embodiment of the Y/C switch 90 is described in co-pending U.S. patent application Ser. No. 08/584,923, filed on the same date as the present application and entitled "Method Of And Apparatus For Providing A High Speed Video Switch," which is hereby incorporated by reference.

The clamped analog input composite video signal CVInR from the buffer and clamp circuit 34 is filtered through a low pass filter 42. The output of the low pass filter 42 is then input to the sync separator circuit 48. The sync separator circuit 48 separates the synchronization pulses from the clamped analog input composite video signal CVInR. The synchronization pulses include horizontal synchronization pulses, equalizing pulses and serration pulses. The synchronization pulses from the sync separator circuit 48 are then input to a vertical reset generator circuit 50 which generates a vertical reset pulse which is active during the presence of serration pulses within the analog input composite video signal CVInR. The output of the sync separator circuit 48, including horizontal sync pulses, equalizing pulses and serration pulses, is provided to a charging circuit which charges up a capacitor when the output of the sync separator circuit is at a low level and discharges the capacitor when the output of the sync separator circuit is at a high level. The serration pulses are at a low level for a greater time period than the equalizing pulses. The charge built up across the capacitor is therefore greater during a serration pulse than during an equalizing pulse. An up threshold level is set so that the voltage built up across the capacitor will not reach the threshold during the low level of an equalization pulse but will reach it during the low level of a serration pulse. During the first serration pulse, the charge across the capacitor rises above the up threshold level causing the vertical reset generator to activate a vertical reset pulse. A down threshold level is set so that the voltage across the capacitor will not fall below that level during the high level of a serration pulse but will fall below it during the next equalizing pulse. During the first equalizing pulse after a serration pulse, the charge across the capacitor falls below the down threshold level causing the vertical reset generator to deactivate the vertical reset pulse. The vertical reset pulse remains deactivated until the next serration pulse. A preferred embodiment of the vertical reset generator circuit 50 is described in co-pending U.S. patent application Ser. No. 08/585,441, filed on the same date as the present application and entitled "Vertical Reset Generator Circuit," which is hereby incorporated by reference.

The horizontal separator circuit 56 receives the output from the sync separator circuit 48, including horizontal synchronization pulses, equalizing pulses and serration pulses and generates an output signal representative of every horizontal synchronization pulse and every other vertical synchronization pulse. The vertical synchronization pulses include equalizing pulses and serration pulses which have a frequency which is twice the frequency of the horizontal synchronization pulses. A capacitor within the horizontal separator circuit 56 is used to store a level of charge. A current source is used to charge the capacitor. A transistor controlled by the output signal provides a discharge path for the capacitor. A comparator monitors the voltage level stored across the capacitor and enables an output generation circuit when the level of charge stored across the capacitor is above a predetermined threshold level. The value of the capacitor and the value of the current source cause the time required to raise the voltage level across the capacitor to a level above the predetermined threshold level to be less than the time between horizontal synchronization pulses and greater than the time between vertical synchronization pulses. The output generation circuit generates the output signal as a pulse signal representative of the synchronization pulse. The output generation circuit is only enabled when the voltage level across the capacitor is greater than the predetermined threshold level. Therefore, the pulse signal is enabled for every horizontal synchronization pulse and for every other vertical synchronization pulse. The output of the horizontal separator circuit 56 is provided to the horizontal phase detector circuit 58 for locking the horizontal sync pulses in phase. A preferred embodiment of the horizontal separator circuit 56 is described in co-pending U.S. patent application Ser. No. 08/583,972, filed on the same date as the present application and entitled "Method Of And Apparatus For Removing Equalizing Pulses Without Using External Pins," which is hereby incorporated by reference.

The horizontal lock detector circuit 60 signals that the output of the horizontal separator circuit 56 and the digital horizontal synchronization pulse signal Dhsync are locked together in phase. The horizontal lock detector circuit monitors a pair of control signals to the charge pump circuit 62 in order to determine when sampling pulses generated by the video system are locked in phase with horizontal synchronization signals within an input composite video signal. The charge pump circuit 62 forms a portion of a horizontal phase-locked loop circuit. The charge pump control signals UP and DOWN are generated by the phase detector circuit 58 within the horizontal phase-locked loop 52 in response to a difference in phase between the sampling pulses and the horizontal synchronization pulses of the input composite video signal. In response to the charge pump control signals, the charge pump circuit 62 generates an output which is used to either increase or decrease the frequency of the sampling pulses in order to lock the sampling pulses in phase with the input composite video signal. Once the sampling pulses are locked in phase with the input composite video signal, the charge pump control signals will become inactive. An output signal is generated by the horizontal lock detector circuit 60 which is active when the sampling pulses are locked in phase with the input composite video signal and inactive when the sampling pulses are not locked in phase with the input composite video signal. A preferred embodiment of the horizontal lock detector circuit 60 is described in co-pending U.S. patent application Ser. No. 08/584,750, filed on the same date as the present application and entitled "Horizontal Lock Detector," which is hereby incorporated by reference.

The chroma lock detector circuit 68 signals that the burst signals Burst0 and Burst1 are locked together in phase. The chroma lock detector circuit 68 monitors the charge pump control signals within the phase-locked loop 54 in order to determine when two input signals to the phase-locked loop Burst0 and Burst1 are locked together in phase. The output signal LOCKC is generated by the chroma lock detector circuit 68 which is active when the two signals are locked together in phase and inactive when the two input signals are not locked together in phase. The charge pump control signals UP and DOWN are generated by the phase detector circuit 66 within the phase-locked loop 54 in response to a difference in phase between the two input signals Burst0 and Burst1. In response to the charge pump control signals, the charge pump circuit 72 generates an output which is used to either increase or decrease the frequency of one of the two input signals in order to lock it in phase with the other signal. Once the two input signals are locked together in phase, the charge pump control signals become inactive. When the charge pump control signals are inactive for a predetermined period of time, signalling that the two signals are locked together in phase, the output of the chroma lock detector circuit 68 is activated and will remain at a logical high voltage level until the charge pump control signals become active again. A preferred embodiment of the burst lock detector circuit 68 is described in co-pending U.S. patent application Ser. No. 08/585,442, filed on the same date as the present application and entitled "Chroma Lock Detector," which is hereby incorporated by reference.

The black and white detector circuit 70 signals whether or not the analog input composite video signal is a color or black and white video signal. The black and white detector circuit 70 monitors the burst signal Burst0 separated from a composite video signal in order to determine when the composite video signal contains color or black and white video information. An output signal is generated by the black and white detector circuit 70 which is active when color information is included and inactive when black and white information is included. The separated burst signal Burst0 will oscillate above and below a first threshold value during a burst period if color information is included, and will remain constant if black and white information is included. When the burst signal oscillates above and below the first threshold value for a predetermined period of time, an output signal is activated and will remain active until the burst signal remains constant during a burst period. A current source is enabled when the burst signal rises above the first threshold value. The current source builds up a first level of charge on a first capacitor during the burst period. A detecting circuit monitors the first level of charge to determine when it rises above a second threshold value. A second level of charge is built up on a second capacitor when the first level of charge is above the second threshold value. The output signal is activated when the second level of charge rises above a third threshold value, signalling that the composite video signal includes color video information and deactivated when the second level of charge falls below a fourth threshold level, signalling that the composite video signal includes black and white video information. A preferred embodiment of the black and white detector circuit 70 is described in co-pending U.S. patent application Ser. No. 08/585,404, filed on the same date as the present application and entitled "Black And White Video Signal Detector," which is hereby incorporated by reference.

The video/graphics overlay circuit 40 of the present invention receives two composite video input signals CVInR and CVInd and combines them into a linear combination output composite video signal CVout depending on the state of the mixer control signals Vmix, M0 and M1. The two composite video input signals CVInR and CVInd are capacitively coupled to the buffer and clamp circuits 34 and 36, respectively, through which the blank or DC level of the signals is clamped to two volts. The outputs of the buffer and clamp circuits 34 and 36 are then fed to the mixer circuit 80 and the burst separator circuits 44 and 46. The mixer circuit 80 generates the output composite video signal CVout which is a linear combination of the input video signals CVInR and CVInd as controlled by the mixer control signals Vmix, M0 and M1. The burst separator circuits 44 and 46 separate the burst signal from the analog input composite video signal CVInR and the digital input composite video signal CVInd, respectively. The extracted burst signals Burst0 and Burst1 are then provided to the burst signal phase-locked loop 54 for locking the burst signals of the analog input composite video signal CVInR and the digital input composite video signal CVInd in phase. The feedback loop of the of the burst signal phase-locked loop 54 is closed through the digital encoder circuit 30 and changes the phase and frequency of the burst signal within the digital input composite video signal CVInd until it is locked in phase with the analog input composite video signal. When the digital input composite video signal CVInd is locked in phase with the analog input composite video signal CVInR, the burst signal lock detector circuit 68 activates the signal LOCKC.

The horizontal phase-locked loop 52 detects the phase difference between the sync signal from the horizontal separator circuit 56 and the digital horizontal sync signal Dhsync. The frequency of the digital input composite video signal is adjusted, again through the digital encoder circuit 30 until the two sync signals are locked in phase. When the digital horizontal sync signal Dhsync is locked in phase with the sync signal from the horizontal separator circuit 56, the horizontal lock detector circuit 60 activates the signal LOCKH.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A video display system configured for receiving an analog input composite video signal having a first phase and a first frequency, and a digital input composite video signal having a second phase and a second frequency, the video display system comprising:

a. an automatic phase and frequency correction circuit configured to receive the analog input composite video signal and the digital input composite video signal for monitoring the first phase, the second phase, the first frequently and the second frequency and ensuring that the second phase and the second frequency are equal to the first phase and the first frequency, wherein the analog composite video signal is a master signal and is not adjusted and the digital input composite video signal is a slave signal and is adjusted so that the second phase equals the first phase and the second frequency equals the first frequency; and b. a mixer circuit configured to receive the analog input composite video signal, the digital input composite video signal and one or more control signals for generating the output composite video signal representing a predetermined ratio of the analog input composite video signal and the digital input composite video signal, wherein the mixer circuit receives the analog input composite video signal and a respective analog ground reference signal for generating a differential analog signal and the digital input composite video signal and a respective digital ground reference signal for generating a differential digital signal.

2. The video display system as claimed in claim 1 further comprising a synchronization output circuit configured to receive the analog input composite video signal, wherein the analog input composite video signal includes horizontal synchronization pulses and vertical synchronization pulses including equalizing pulses and serration pulses, and further wherein the synchronization output circuit generates a synchronization signal representative of every horizontal synchronization pulse and every other vertical synchronization pulse.

3. The video display system as claimed in claim 2 further comprising a vertical reset pulse generating circuit coupled to the synchronization output circuit for generating a vertical reset pulse representative of the presence of serration pulses within the analog input composite video signal.

4. The video display system as claimed in claim 3 further comprising a clamping circuit configured to receive the analog input composite video signal and the digital input composite video signal for clamping a DC level of the analog and digital input composite video signals to a predetermined value.

5. The video display system as claimed in claim 4 further comprising an analog burst separating circuit coupled to the clamping circuit for separating an analog burst signal from the analog input composite video signal.

6. The video display system as claimed in claim 5 further comprising a digital burst separating circuit coupled to the clamping circuit for separating a digital burst signal form the digital input composite video signal.

7. The video display system as claimed in claim 6 further comprising a burst pulse generating circuit configured to receive the analog input composite video signal and coupled to the analog and digital burst separating circuits for generating a burst pulse signal representative of a time period during which an analog burst signal is present within the analog input composite video signal.

8. A video display system for receiving video input signals and generating an output composite video signal comprising:

a. an analog input video receiving circuit configured for receiving an analog input video signal having a first phase and first frequency;
   b. a digital input video receiving circuit configured for receiving a digital input video signal having a second phase and a second frequency;
   c. a phase and frequency detecting circuit coupled to receive a first signal representative of the first phase and the first frequency and a second signal representative of the second phase and the second frequency for detecting a first difference between the first signal and the second signal and generating a control output signal representative of the first difference signal;
   d. a correction circuit coupled to receive the control output signal for adjusting the second phase and the second frequency in response to a magnitude of the control output signal; and
   e. a mixing circuit coupled to the analog input video receiving circuit and to the digital input video receiving circuit and further configured for receiving an analog ground reference signal and a digital ground reference signal for generating an analog differential signal representative of a second difference between the analog input video signal and the analog ground reference signal and a digital differential signal representative of a third difference between the digital input video signal and the digital ground reference signal for combining the analog differential signal and the digital differential signal in a predetermined ratio into an output video signal.

9. The video display system as claimed in claim 8 further comprising an analog clamping circuit coupled to the analog input video receiving circuit for clamping a DC level of the analog input video signal to a predetermined value and generating an analog clamped output signal representative of the analog input video signal with the DC level clamped to the predetermined value.

10. The video display system as claimed in claim 9 further comprising a digital clamping circuit coupled to the digital input video receiving circuit for clamping a DC level of the digital input video signal to the predetermined value and generating a digital clamped output signal representative of the digital input video signal with the DC level clamped to the predetermined value.

11. The video display system as claimed in claim 10 further comprising an analog burst separating circuit coupled to the analog clamping circuit for generating an analog burst output signal representative of only an analog burst signal from the analog input video signal.

12. The video display system as claimed in claim 11 further comprising a digital burst separating circuit coupled to the digital clamping circuit for generating a digital burst output signal representative of only a digital burst signal from the digital input video signal.

13. The video display system as claimed in claim 12 wherein the analog burst signal is the first signal and the digital burst signal is the second signal and both the analog burst signal and the digital burst signal are coupled to the phase and frequency detecting circuit for detecting the first difference.

14. The video display system as claimed in claim 13 further comprising a burst pulse generating circuit coupled to the analog input video receiving circuit and to the analog and digital burst separating circuits for generating a burst pulse signal representative of a time period during which an analog burst signal is present within the analog input video signal.

15. The video display system as claimed in claim 14 further comprising a synchronization output circuit coupled to the analog input video receiving circuit, wherein the analog input video signal includes horizontal synchronization pulses and vertical synchronization pulses including equalizing pulses and serration pulses and further wherein the synchronization output circuit generates a synchronization signal representative of every horizontal synchronization pulse and alternate vertical synchronization pulses.

16. The video display system as claimed in claim 15 further comprising a vertical reset pulse generating circuit coupled to the synchronization output circuit for generating a vertical reset pulse representative of the presence of serration pulses within the analog input composite video signal.

17. A method of automatically adjusting a phase and frequency of an encoded digital composite video signal to lock to a phase and frequency of an analog video signal comprising the steps of:

a. receiving an analog ground reference signal and an analog video signal having a first phase and a first frequency;
   b. receiving a digital ground reference signal and a digital video signal having a second phase and a second frequency;

c. monitoring the first phase, the first frequency, the second phase and the second frequency;

d. detecting a first difference between the first phase and the second phase and a second difference between the first frequency and the second frequency;

e. adjusting the encoded digital composite video signal in order to eliminate the first and second differences;

f. generating an analog differential signal representative of an analog difference between the analog video signal and the analog ground reference signal;

g. generating a digital differential signal representative of a digital difference between the digital video signal and the digital ground reference signal; and h. generating an output video signal including a predetermined ratio of the analog differential signal and the digital differential signal.

18. The method as claimed in claim 17 further comprising the step of clamping a DC level of the analog video signal and the digital video signal to a predetermined value.

19. The method as claimed in claim 17 further comprising the step of generating a burst pulse signal representative of a time period during which an analog burst signal is present within the analog video signal.

20. The method as claimed in claim 19 further comprising the step of separating the analog burst signal from the analog video signal and a digital burst signal from the digital video signal.

21. The method as claimed in claim 19 further comprising the step of generating a synchronization output signal representative of every horizontal synchronization pulse and every other vertical synchronization pulse within the analog video signal, wherein the vertical synchronization pulses include equalizing pulses and serration pulses included within a vertical blanking period of the analog video signal.

22. The method as claimed in claim 21 further comprising the step of generating a vertical reset pulse representative of the presence of serration pulses within the analog video signal.

23. A method of automatically adjusting a phase and frequency of an encoded digital composite video signal to lock to a phase and frequency of an analog video signal and generating an output video signal, comprising the steps of:

a. receiving an analog ground reference signal and an analog video signal having a first phase and a first frequency;

b. receiving a digital ground reference signal and a digital video signal having a second phase and a second frequency;

c. clamping a DC level of the analog video signal to a predetermined value;

d. clamping a DC level of the digital video signal to the predetermined value;

e. monitoring the first phase, the first frequency, the second phase and the second frequency;

f. detecting a first difference between the first phase and the second phase and a second difference between the first frequency and the second frequency;

g. adjusting the encoded digital composite video signal in order to eliminate the first and second differences;

h. generating an analog differential signal representative of an analog difference between the analog video signal and the analog ground reference signal;

i. generating a digital differential signal representative of a digital difference between the digital video signal and the digital ground reference signal; and j. generating an output video signal including a predetermined ratio of the analog differential signal and the digital differential signal.

24. The method as claimed in claim 23 further comprising the step of generating a burst pulse signal representative of a time period during which an analog burst signal is present within the analog video signal.

25. The method as claimed in claim 24 further comprising the step of separating the analog burst signal from the analog video signal and a digital burst signal from the digital video signal.

26. The method as claimed in claim 25 further comprising the step of generating a synchronization output signal representative of every horizontal synchronization pulse and alternate vertical synchronization pulses within the analog video signal, wherein the vertical synchronization pulses include equalizing pulses and serration pulses included within a vertical blanking period of the analog video signal.

27. The method as claimed in claim 26 further comprising the step of generating a vertical reset pulse representative of the presence of serration pulses within the analog video signal.

* * * * *

UNITED STATES PATENT AND TRADEMARK OFFICE
CERTIFICATE OF CORRECTION

PATENT NO. : 5,815,212

DATED : September 29, 1998

INVENTOR(S) : Steve Edwards et al.

It is certified that error appears in the above-identified patent and that said Letters Patent is hereby correct as shown below:

IN THE DRAWINGS

Replace Figure 3, on drawing sheet 3 of 3, with the attached drawing sheet which adds the reference numbers --42--, --44--, --46--, --48--, --50--, --52--, --54--, --56--, --58--, --60--, --62--, --64--, --66--, --68--, --70--, --72--, --74-- and --90-- to Figure 3.

IN THE SPECIFICATIONS

In Column 10, line 38, delete "08/885,298," and insert --08/585,298,--between "Ser. No." and "filed".

In Column 11, line 35, please delete "08/534,926," and insert --08/584,926,--between "No." and "filed".

Signed and Sealed this

Thirty-first Day of October, 2000

Attest:

Q. TODD DICKINSON

Attesting Officer

Director of Patents and Trademarks